Aug. 4, 1936.  D. C. PEDERSEN  2,049,661
TWO-WHEELED MOTOR DRIVEN ROTO-TILLER
Filed April 3, 1934
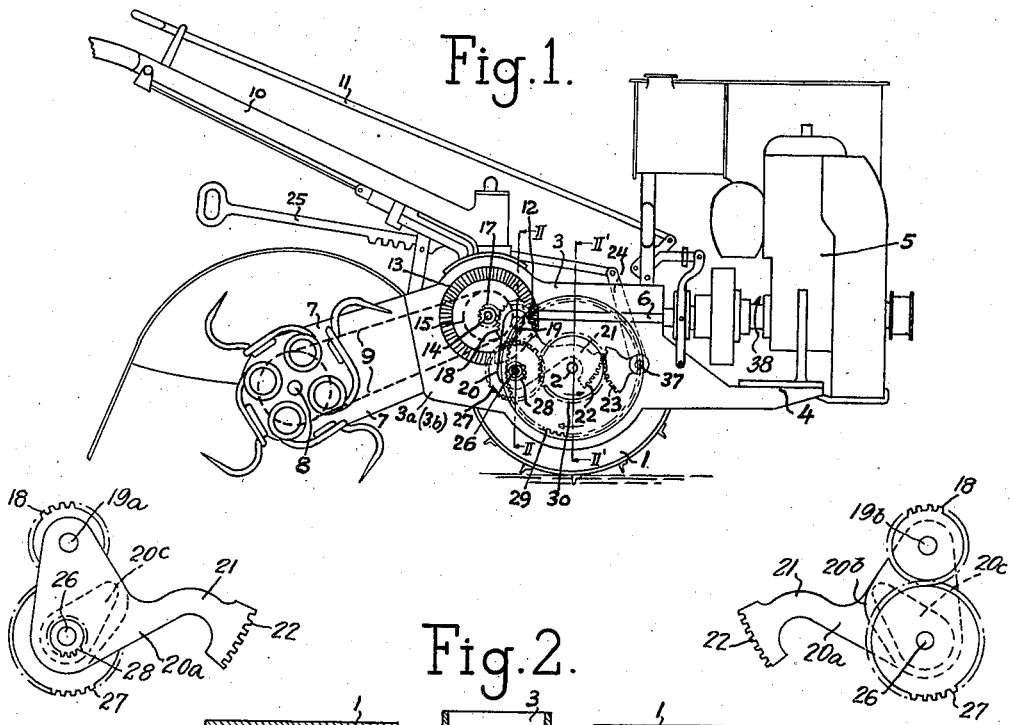
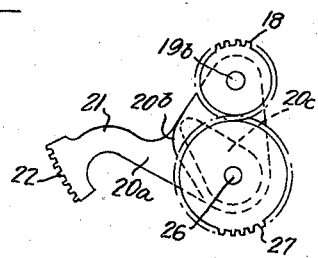
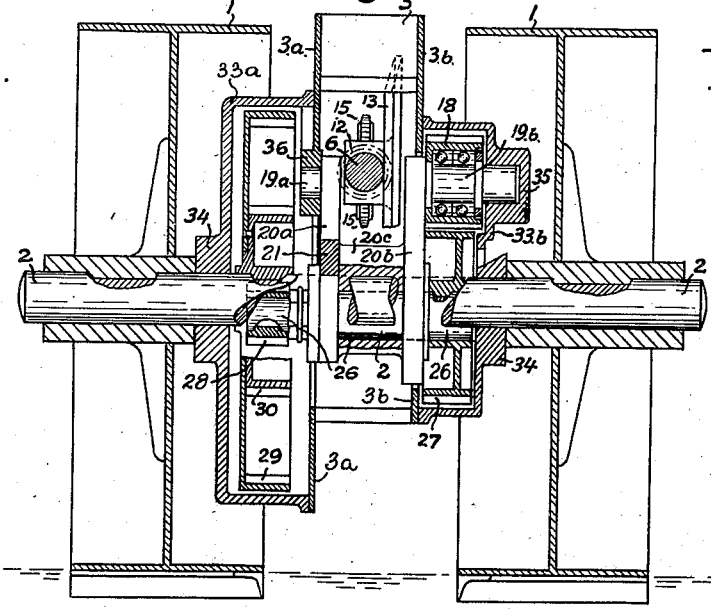
INVENTOR:
DINES CHRISTIAN PEDERSEN
BY: Francis E. Boyce
ATTORNEY Patented Aug. 4, 1936

2,049,661

UNITED STATES PATENT OFFICE 2,049,661

TWO-WHEELED MOTOR-DRIVEN ROTO-TILLER

Dines Christian Pedersen, Holbek, Denmark

Application April 3, 1934, Serial No. 718,778

2 Claims. (Cl. 74—355)

The invention relates to a two-wheeled motor-driven roto-tiller having a simple non-reversible motor and being distinguished in, that it is provided with a combined driving, uncoupling and reversing device, so that in spite of its motor being non-reversible it is able to be driven backward as well as ahead or not at all driven by the working motor.

One construction of the invention is illustrated on the drawing.

Fig. 1 shows, diagrammatically, a two-wheeled motor driven tilling machine in side elevation, although with the front (right) driving wheel omitted and with a plain indication of the members forming part of the driving mechanism, even if the same be not actually visible.

Fig. 2 is a vertical section of the machine, as far as the right hand part of the figure is concerned mainly along the line II—II in Fig. 1, and as far as the left part of the figure is concerned mainly along the line II'—II' in Fig. 1.

Fig. 3 is a detail view from the right side of a certain shifting lever and associated parts used in this invention.

Fig. 4 is a similar view but taken from the left side.

1 are the driving wheels which are secured to an axle 2 common to both wheels. The said axle supports the frame 3 of the machine, which mainly consists of a narrow box with vertical side walls 3a and 3b (Fig. 2) forming, at the front, a platform 4 adapted to support the non-reversible motor 5, the shaft 6 of which extends horizontally towards the rear between the side walls of the machine frame. The rear end of the frame extends obliquely rearward and downward in the shape of a hollow stiff arm 7, which supports bearings for the shaft 8 of the tiller drum and encloses the transmission members (chain 9 or the like) serving to drive the said shaft. 10 is the steering lever, which is attached to the top of the machine frame, and 11 is a pulling rod for engaging and disengaging the coupling of the motor by a manipulation from the driver's position.

The motor shaft 6 supports, at its rear end, a bevel pinion 12 engaging a bevel gear-wheel 13 on a shaft 14, the main shaft of the machine, journaled in the walls of the machine frame and supporting a pinion and a sprocket wheel 15, which by means of the transmission members (chain 9 or the like) mentioned before drives the tiller drum. The pinion 17 engages a gear wheel 18 which runs freely on a shaft 19 supported in the machine frame. The shaft 19 also forms a pivot for a shifting lever 20 the forward end of which is formed as a toothed sector 22 concentric with the shaft or pivot 19. This sector meshes with a toothed sector or gear segment 23 which is fixed on a shaft 37 journalled in the frame and which, by means of an arm 24 secured to said shaft 37 and a shifting rod 25 connected to the free end of said arm, can be swung in one and the other direction about the axis of the shaft 37 thus simultaneously causing swinging movement in a corresponding direction of the shifting lever 20 about its pivot 19. A shaft 26 is journalled in the shifting lever 20 on which is fixed a gear wheel 27 engaging the gear wheel 18. On the shaft 26 is also fixed a shifting pinion 28 located between an internal gear 29 and an external gear 30 and the pinion 28 is caused to mesh with one of the two gears 29 and 30 by swinging movement of the shifting lever 20. Both gears 29 and 30 are firmly fixed on the wheel axle 2 which with the wheels 1 may thus be rotated in one direction or the other when the main shaft is driven by the motor, the direction of movement being governed by the meshing of the pinion 28 with a respective gear 29 or 30. The pinion 28 may be positioned out of mesh with both gears 29 and 30 thus disconnecting the axle from the motor and bringing the machine to rest. Obviously, change in the size of the pinion 28 will correspondingly change the ratio of the driving gearing for the wheels 1.

Many of the details are more clearly shown in Figs. 2, 3 and 4 and from these figures it will be seen that machine frame 3 has two side walls 3a and 3b and on the outside of each of them and firmly connected thereto a heavy casing 33a and 33b, respectively, supported on the wheel axle 2 by bearings 34. The casing encloses the two coaxially arranged gears 29 and 30 and also the shifting pinion 28 disposed in the space between said gears. The casing 33b encloses the pinion 17 (to be seen only in Fig. 1), and the gear-wheels 18 and 27. The shifting lever 20 (Fig. 1) consists of two parallel arms 20a and 20b Figs. 2, 3 and 4 firmly interconnected by means of a cross-piece 20c and fitted each with a lateral pin shown respectively at 19a and 19b, said pins or stub shafts being aligned to form the pivot of the shifting lever. The pin or stub shaft 19a is journaled in a reinforcement 36 of the side wall 3a. The pin 19b, also serves as a shaft for the gear wheel 18, and is journaled in a reinforcement 35 of the wall of the casing 33b. The shaft 26, having fixed on one of its ends the gear wheel 27 and on its other end the shifting pinion 28, is journaled in both of the arms 20a and 20b (and the cross-piece 20c)

of the shifting lever and extends through slots in the side walls 3a and 3b of the machine frame, the slots being of such width that the shaft will not engage the edge of the same, when the shifting lever is swung by means of the shifting rod 25, the arm 24 and the toothed sector 23 in engagement with the toothed sector 22 on a forward end part of one of the shifting lever arms, to shift the pinion 28 from engagement with one of the gears 29 and 30 to engagement with the other one of these gears.

As will be understood the transmission of force from the motor 5 to the driving wheels 1 is from the motor shaft 6, bevel pinion 12, bevel gear-wheel 13, shaft 14, pinion 17, gear-wheel 18, gear-wheel 27, shaft 26 and shifting pinion 28 to either the one or the other one of the two gears 29 and 30. These gears are firmly fixed on the axle 2, on which are also firmly fixed the driving wheels 1. When the machine is to be moved ahead over the ground, the driving force will be transmitted through the gear 29, whereas the driving force will be transmitted through the gear 30 when the machine has to be moved backward, the direction of revolution of the non-reversible motor being determined to suit this demand i. e., in the case illustrated the direction of revolution should be as indicated by the arrow 38 in Fig. 1.

Having thus described my invention, what I claim is:—

1. In a two-wheeled roto-tiller driven by a non-reversible motor and having its main shaft mounted transversely in the machine frame, a pinion on said main shaft, a pinion rotatably supported by the machine frame and engaged by said first named pinion, a shifting lever swingably mounted on the machine frame about the axis of said second named pinion, two toothed rims facing each other and being co-axially arranged relatively to the wheels of the roto-tiller and secured to their axle, a shaft journaled in the said shifting lever, two pinions secured to said shaft, one of said pinions being engaged by the aforesaid second named pinion and the other one being disposed in the space between said two toothed rims, and means for swinging said shifting lever to bring the last named pinion into engagement with one or the other of said rims or free of them both.

2. In a two-wheeled roto-tiller driven by a non-reversible motor and having its main shaft mounted transversely in the machine frame, a pinion on said main shaft, a pinion rotatably supported by the machine frame and engaged by said first named pinion, a shifting lever swingably mounted on the machine frame about the axis of said second named pinion, two toothed rims facing each other and being co-axially arranged relatively to the wheels of the roto-tiller and secured to their axle, a shaft journaled in the said shifting lever, two pinions secured to said shaft, one of said pinions being engaged by the aforesaid second named pinion and the other one being disposed in the space between said two toothed rims, and means for swinging said shifting lever to bring the last named pinion into engagement with one or the other of said rims or free of them both, said means comprising a toothed sector at the foremost end of the shifting lever, a toothed sector in engagement therewith, an arm firmly connected to said last named sector and a shifting rod connected with said arm.

DINES CHRISTIAN PEDERSEN.